UNITED STATES PATENT OFFICE.

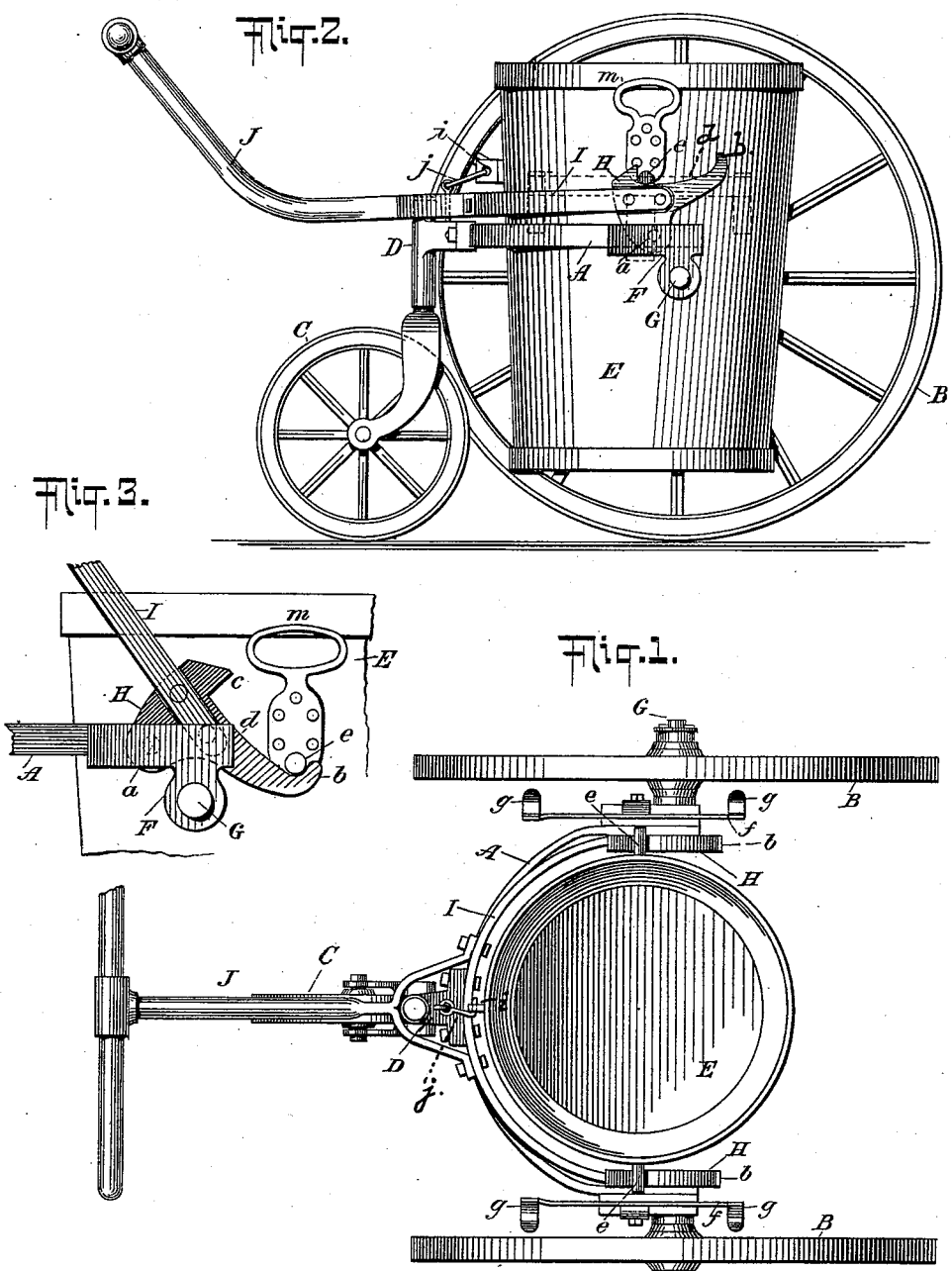

CHARLES HVASS, OF NEW YORK, N. Y.

TRUCK.

SPECIFICATION forming part of Letters Patent No. 536,629, dated April 2, 1895.

Application filed August 28, 1894. Serial No. 521,485. (No model.)

*To all whom it may concern:*

Be it known that I, CHARLES HVASS, a citizen of the United States, and a resident of New York, in the county of New York and State of New York, have invented certain new and useful Improvements in Trucks, of which the following is a specification.

The invention relates to improvements in trucks, and particularly to improvements in the class of trucks used for carrying receptacles intended to hold ashes, garbage or other material.

The invention consists in the novel features of construction hereinafter described and particularly pointed out in the claim.

In accordance with my invention the receptacle is provided on opposite sides with trunnions; and the truck frame is of a form adapting it to pass upon and substantially inclose the opposite sides of said receptacle and is provided with an auxiliary pivoted frame which is adapted also to pass upon opposite sides of the receptacle and provided at one end with a handle and at the opposite sides of its other end with inclined bearings, the latter being rigidly secured to said auxiliary frame and adapted when said frame is turned upward upon its pivots to hook beneath the trunnions of the receptacle, and when said frame is turned downward again to elevate said receptacle. Upon the elevation of the receptacle the trunnions thereon will ride down the inclined upper surfaces of said bearings and pass to the rear of the supporting axles, thus obviating all tendency on the part of the receptacle to turn the auxiliary frame upward during the travel of the truck. In the use of the truck the main frame is not elevated, that always maintaining its position, while the auxiliary frame connected with the bearings is alone operated to clutch and elevate the receptacle or lower and release the same.

The truck is constructed with a view of securing great simplicity in the formation and arrangement of its parts, ease in its operation and great durability, the latter being particularly desirable, since the truck is intended for use by persons who will not ordinarily handle it with any large amount of care. The invention will be more fully understood from the detailed description hereinafter presented reference being had to the accompanying drawings forming a part of this application, and in which—

Figure 1 is a top view of a truck and receptacle constructed in accordance with and embodying the invention. Fig. 2 is a side elevation of same, one of the supporting wheels being omitted for clearness of illustration, and Fig. 3 is an enlarged detached side elevation of a portion of the receptacle, main frame and auxiliary frame and illustrating the position of the bearings when the auxiliary frame is turned upward to cause said bearings to reach beneath the trunnions on the receptacle.

In the drawings, A designates the main frame of the truck, and B C the supporting wheels thereof, the wheel C being a small wheel swiveled in the casting D bolted to the main frame A. The frame A is of a form adapting it to pass upon the opposite sides of the receptacle E and is provided at its opposite sides with the plates F, to which are secured the axles G for the main supporting wheels B. The plates F are secured to the outer sides of the frame A and extend below said frame, as shown in Fig. 2, the portion thereof extending below the frame A being the part which carries the axles G.

The frame A may be of any desirable outline adapted to the shape of the receptacle E, and in the present instance, the latter being circular, the frame is made semicircular in outline.

Upon the inner opposite sides of the frame A, are pivotally mounted the bearings H, and to these bearings are rigidly secured the opposite sides of one end of the auxiliary frame I, the latter substantially corresponding in outline with the frame A and being located directly over the same. The auxiliary frame I is provided at one end with the handle J and at the opposite sides of its other end with the said bearings H, which are rigidly secured to said frame I, but have a pivotal movement with said frame on the axles *a*. The bearings H correspond with each other and each is provided at its front end with the hook *b* and at its rear end with the shoulder *c*, while between said hook and said shoulder, the said bearings have a downwardly inclined surface *d* upon which the trunnions *e* secured upon the receptacle E have their movement. The axles $a$ upon which the auxiliary frame I and bearings H are pivotally mounted, are located at the rear of the main axle G for the supporting wheels B, as indicated more clearly in Figs. 2 and 3, and the shoulder $c$ of the said bearings is, also, located in the rear of said axles G and $a$. The bearings H and frame I being rigid with each other, constitute an integral frame which may be raised or lowered at will on the axles $a$ by means of the handle J, the latter serving, also, as a means for propelling the truck by hand.

Upon opposite sides of the frame A, are, for convenience, secured the metal frames $f$, $f$, having pockets $g$, $g$, of convenient form to receive a brush or shovel.

Figs. 1 and 2 illustrate the receptacle E in position upon the truck, and in these figures it will be observed that the trunnions $e\ e$ on said receptacle have passed down the inclined surfaces $d$ of the bearings H and are in contact with the shoulders $c$ of said bearings, in which position they are at the rear of the vertical plane of the main supporting axles G and axles $a$.

In order to more securely maintain the receptacle E in position, I have provided the receptacle with an eye $i$ and the casting D of the truck frame with a hook $j$, as shown in Fig. 2, the said hook being adapted to engage the said eye and aid in retaining the receptacle in position with its trunnions $e$ against the shoulders $c$.

When it is desired to lift the receptacle E from the ground, the handle J and frame I, are turned upward upon the axles $a$ as indicated in Fig. 3, whereupon the truck is moved to embrace the opposite sides of the receptacle and the hook shaped ends $b$ of the bearings H passed below the trunnions $e$, as shown in Fig. 3, after which the frame I and handle J are lowered to their normal positions illustrated in Fig. 2, the result being that the bearings H will elevate the receptacle E, the trunnions of the latter being held by said bearings and sliding down the inclined surfaces $d$ of the same, to the shoulders $c$, as shown in Fig. 2. The receptacle E is thus elevated upon the truck and may be there additionally secured by means of the hook $j$.

When it is desired to lower the receptacle E to the ground, the hook $j$ will be detached and the frame I and handle J, elevated as before; this movement allowing the trunnions $e$ to slide over the surfaces $d$ of the bearings H and be caught by the hooks $b$, which upon the receptacle E reaching the ground will be passed from below the said trunnions and the truck will be withdrawn from the receptacle, leaving the latter released from the truck.

The receptacle E may, if desired, be provided with handles $m$.

It is to be observed that the frame I is in near relation to the frame A, and that when the frame I is in its lower position it is supported at its front end by the bearing plates H and axles $a$, while at its rear end it is supported directly on the frame A. When the loaded receptacle E is upon the truck its trunnions $e$ bearing against the shoulders $c$ and being at that time in rear of both the axles G and $a$, cause the weight of the receptacle to come upon the frame I and hold it down upon the frame A, which being in close relation to said frame I effectually supports the same.

The entire structure of the truck taken as a whole possesses great superiority as to strength, durability, practicability, and the ease with which it may be operated.

What I claim as my invention, and desire to secure by Letters Patent, is—

The truck hereinbefore described, consisting of the frame A mounted upon the main wheels B and swivel C, combined with the auxiliary frame I conforming and in close relation to the said frame A and having the handle J at its rear end, and the bearing plates H rigid with the front ends of said frame I and mounted on the frame A by means of the axles $a$ which are in rear of the axles of the said wheels B, the said plates H each having the hook $b$, inclined surface $d$ and shoulder $e$, the latter being at the rear of said axles $a$ and at the base of the inclination of the surfaces $d$; substantially as and for the purposes set forth.

Signed at New York, in the county of New York and State of New York, this 27th day of August, A. D. 1894.

CHARLES HVASS.

Witnesses:
CHAS. C. GILL,
EDWARD D. MILLER.